United States Patent [19]

Lindner

[11] 3,927,234

[45] Dec. 16, 1975

[54] IMPREGNATING COMPOUND FOR FIBER GLASS MATS

[75] Inventor: Heinz-Joachim Lindner, Nurnberg, Germany

[73] Assignee: Siemens Aktiengesellschaft, Munich, Germany

[22] Filed: Sept. 25, 1972

[21] Appl. No.: 291,935

[30] Foreign Application Priority Data
Sept. 29, 1971 Germany............................ 2148692

[52] U.S. Cl........... 428/273; 260/37 EP; 260/42.14; 260/47 EP; 260/837 R; 428/290
[51] Int. Cl.²................... B23B 17/00; B32B 27/04; B32B 17/04
[58] Field of Search........... 260/837 R; 117/140 A, 260/126 GE; 161/170; 428/273, 428/290

[56] References Cited
UNITED STATES PATENTS

| | | | |
|---|---|---|---|
| 2,840,541 | 6/1958 | Pezzaglia | 260/46 |
| 2,879,252 | 3/1959 | Been et al. | 260/837 R |
| 3,322,852 | 5/1967 | Trementozzi et al. | 260/837 R |
| 3,322,853 | 5/1967 | Trementozzi et al. | 260/837 R |
| 3,397,169 | 8/1968 | Wilkinson | 260/837 R |
| 3,417,050 | 12/1968 | Price | 260/47 EP |
| 3,496,250 | 2/1970 | Czerwinski | 260/837 |
| 3,616,193 | 10/1971 | Labowitz | 260/837 |
| 3,627,565 | 12/1971 | Plueddemann | 117/126 GE |
| 3,686,359 | 8/1972 | Soldatos | 260/836 |
| 3,704,268 | 11/1972 | Wynstra | 260/47 EP |

OTHER PUBLICATIONS

Belanger et al., "Chlorine Content of Epoxy Resins" in Modern Plastics, Nov. 1959, pp. 154, 156, 157, 159, 202, 207–208, 210.
Chemical Abstracts, Vol. 78: 16885P 1973.

*Primary Examiner*—Ralph Husack
*Assistant Examiner*—William H. Schmidt
*Attorney, Agent, or Firm*—Kenyon & Kenyon Reilly Carr & Chapin

[57] ABSTRACT

Impregnating compounds for fiber glass mats or cloth are disclosed which contain a repurified epoxy resin on a bisphenol A base and with a chlorine content of less than 0.1 percent by weight, and including at least one hardenable hydrocarbon polymer, preferably hydrocarbon resins on a polybutadiene base with a component of at least 60 percent of 1, 2 adduct and copolymers of the polybutadiene with styrene, and in addition a filler, a lubricant and a hardener.

5 Claims, No Drawings

IMPREGNATING COMPOUND FOR FIBER GLASS MATS

The present invention relates to an impregnating compound for fiber glass mats or cloth for the manufacture of molding mats on the basis of a filler-containing, repurified epoxy resin with a chlorine content of not more than 0.1 percent by weight.

The subject of the present invention is the further development of an impregnating compound which involves the inclusion of at least one hardenable hydrocarbon polymer in the impregnating compound.

According to a preferred embodiment of the invention, hydrocarbon resins on a polybutadiene base with a percentage of at least 60 percent of 1, 2-adduct and copolymers of the polybutadiene with styrene, commercially available as Buton 100, are used as hydrocarbon polymers.

According to a further embodiment of the invention, surface-treated fillers, particularly surface-activated chalk, are used. In addition, in accordance with the invention, of a hardenable hydrocarbon polymer, particularly a hydrocarbon resin on a polybutadiene base or of copolymers with styrene, provides improvements in many respects. The thermal stability as well as the leakage resistance are improved substantially. A very important advantage is that the curing times are substantially reduced and the mold release stiffness is increased.

In accordance with the invention, the addition of a hardenable hydrocarbon resin, particularly in the case of molding mats with a low glass content, such as are necessary for some applications, for instance, moldings with very long flow distances, favorable mechanical and electrical properties are achieved, particularly good thermal stability and leakage resistance.

The curing, which in the average takes about half the time of that for unmodified impregnating compounds is preferably carried out at a temperature of 175°C.

The base materials can be impregnated with the impregnating compound according to the invention in conventional facilities by brushing, spraying or by means of a roller frame, using commercially available base materials, for instance, fiber glass mats.

Suitable epoxy resins are obtainable by known methods through reacting a multivalent phenol such as 4, 4' dihydroxydiphenylmethylmethane ("bisphenol-A") with, for instance, epichlorhydrin and repurification of the reaction product down to a chlorine content of less than 0.1 percent by weight.

In accordance with the invention hardenable hydrocarbon resins on a polybutadiene base, preferably those with a percentage of at least 60 percent of 1,2 adduct as well as copolymers of the polybutadiene with styrene can be used; such products have been known already for quite some time and are available commercially under the names Plastikator 32 and Buton 100.

The mixing ratio by weight of epoxy resin and hydrocarbon polymers may be 9:1 to 6:4, and preferably 8:2.

The impregnating compounds according to the invention may further contain fillers, pigments, lubricants and other additives which may amount to as much as 150 percent by weight of the repurified epoxy resin and hydrocarbon polymers. The added substances should be practically free of chlorine. Suitable fillers are, for instance, powdered rock, glass powder, chalk and quartz powder.

Aromatic and cyclic amines may be used as hardeners, 4, 4'-diaminodiphenylmethane is preferred.

Optimum properties of the laminates and moldings may be obtained with a mixing ratio by weight of 80:20 of the individual components. The water absorption of such moldings and sheets is extremely low.

The fields of application of the fiber glass molding mats manufactured using the impregnating compounds according to the present invention are highly diverse. As laminates and moldings, they find use, for instance, as switch feedthroughs, plugs, housings, switching rods, terminal strips and the like.

To illustrate the invention, the following examples will be cited:

EXAMPLE 1

Resin mixture I: — 100 parts by weight of a repurified epoxy resin with an epoxy number of 0.55 and 0.58 and a chlorine content of less than 0.1 percent are thoroughly mixed with 25 parts by weight of 4, 4'-diaminodiphenylmethane, 0.5 percent parts by weight of zinc stearate as lubricant and 3 to 15 parts by weight of a pigment at about 50°C.

Resin mixture II: — 90 parts by weight of polybutadiene with a percentage of more than 60 percent of 1,2 adduct, 10 parts by weight of monostyrene or another vinyl monomer, 4 parts by weight of a mixture of dicumyl peroxide and 2, 5-dimenthyl-2, 5-di(t-butylperoxy)hexane in the ratio of 1:1, 1 part by weight of calcium stearate and 0.5 parts by weight of a vinylsilane ester are stirred very intensively for about 2 hours at 80°C.

Impregnating mixture — 90 parts by weight of the resin mixture I are mixed thoroughly with 10 parts by weight of the resin mixture II and 100 parts by weight of a surface-treated chalk at about 50°C. This castable mixture is now used to impregnate commercially available fiber glass mats which are only very weakly bonded. The impregnation can be carried out by known processes by brushing, spraying or more preferably by means of a roller frame. After the impregnating process the fiber glass mat, which is between two protective sheets, is laid out flat. It solidifies at room temperature within 24 to 36 hours to form a hard, board-like product.

Suitably cut blanks can be molded, after the protective sheets are removed to form moldings of high electrical and mechanical quality. Preheating the blanks by high frequency or in a heating oven greatly improves the processability.

With a curing temperature of 175°C and a curing time of 60 seconds per mm of wall thickness, the following properties, which can be further substantially improved by a 24-hour anneal at 150°C, are obtained on standard specimens:

|  | unannealed | annealed |
|---|---|---|
| Bending strength, N/mm² | 170 | 175 |
| Impact strength, mmN/mm² | 80 | 95 |
| Thermal stability (Martens) °C | 107 | 155 |
| Leakage resistance | KA 3c | KA 3c |

EXAMPLE 2

The resin mixtures described above are mixed in the following ratio:

80 parts by weight of the resin mixture I are mixed thoroughly at 50°C with 20 parts by weights of the resin mixture II and 100 parts by weight of a surface-treated chalk.

The fiber glass mat is impregnated also as already described.

Molded under the same conditions as explained in Example 1, the following properties are obtained:

|  | unannealed | annealed |
|---|---|---|
| Bending strength. N/mm$^2$ | 175 | 205 |
| Impact strength, mmN/mm$^2$ | 90.5 | 130 |
| Thermal stability (Martens), °C | 104 | over 250 |
| Leakage resistance | KA 3c | KA 3c |

EXAMPLE 3

If 70 parts by weight of resin mixture I are thoroughly mixed at 50°C with 30 parts by weight of the resin mixture II and 100 parts by weight of surface-treated chalk, the following property values are obtained after impregnation of the fiber glass mat and with blanks made therefrom, under the same process conditions as already described:

|  | unannealed | annealed |
|---|---|---|
| Bending strength. N/mm$^2$ | 150 | 175 |
| Impact strength, mmN/mm$^2$ | 85.5 | 102 |
| Thermal stability (Martens), °C | 115 | over 250 |
| Leakage resistance | KA 3c | KA 3d |

I claim:
1. An impregnated fiber glass mat comprising
   a. a fiber glass mat material and
   b. an impregnating composition for said mat material comprising a mixture of:
      1. repurified epoxy resin based on bis-phenol A having a maximum chlorine content of 0.1 percent by weight; and
      2. at least one hardenable hydrocarbon polymer comprising a polybutadiene base having at least 60 percent of the 1,2 adduct, the weight ratio of said epoxy resin to said polymer being between 6 to 4 and 9 to 1.
2. The mat of claim 1, wherein said weight ratio of said epoxy resin said thermosetting hardenable hydrocarbon polymer is 8 to 2.
3. The mat of claim 1, including a filler having a weight of 75 to 150 percent of said epoxy resin and said thermosetting hardenable hydrocarbon polymer.
4. The mat of claim 3, wherein said filler is surface-treated.
5. The mat of claim 1, wherein theromosetting hardenable hydrocarbon polymer is a compound selected from the group consisting of a hydrocarbon resin on a polybutadiene base and a copolymer of polybutadiene and styrene.

* * * * *

UNITED STATES PATENT AND TRADEMARK OFFICE
CERTIFICATE OF CORRECTION

PATENT NO. : 3 927 234
DATED : December 16, 1975
INVENTOR(S) : HEINZ-JOACHIM LINDNER It is certified that error appears in the above-identified patent and that said Letters Patent are hereby corrected as shown below:

In column 4, line 15 (claim 2) add --to-- after "resin"

*Signed and Sealed this*

*twenty-third* Day of *March 1976*

[SEAL]

Attest:

RUTH C. MASON
*Attesting Officer*

C. MARSHALL DANN
*Commissioner of Patents and Trademarks*